United States Patent
Michenfelder et al.

(10) Patent No.: US 7,214,918 B2
(45) Date of Patent: May 8, 2007

(54) SENSOR DEVICE, PARTICULARLY FOR CONTROLLING LIGHTING DEVICES OF A MOTOR VEHICLE

(75) Inventors: Gebhard Michenfelder, Lichtenau (DE); Andreas Schneider, Ottersweier (DE)

(73) Assignee: Robert Bosch GmbH, Stuttgart (DE)

( * ) Notice: Subject to any disclaimer, the term of this patent is extended or adjusted under 35 U.S.C. 154(b) by 178 days.

(21) Appl. No.: 10/466,943

(22) PCT Filed: Jul. 2, 2002

(86) PCT No.: PCT/DE02/02397

§ 371 (c)(1),
(2), (4) Date: Jan. 14, 2004

(87) PCT Pub. No.: WO03/045734

PCT Pub. Date: Jun. 5, 2003

(65) Prior Publication Data
US 2004/0113053 A1    Jun. 17, 2004

(30) Foreign Application Priority Data
Nov. 21, 2001   (DE)   ............... 101 57 028

(51) Int. Cl.
*H01L 27/00* (2006.01)
*G08G 1/00* (2006.01)
*G01N 21/55* (2006.01)

(52) U.S. Cl. ............ 250/208.1; 340/901; 356/445
(58) Field of Classification Search .......... 250/208.1, 250/227.25, 574, 227.5; 219/202, 203; 340/815.41, 340/815.42, 601, 602, 901; 356/239.8, 445
See application file for complete search history.

(56) References Cited

U.S. PATENT DOCUMENTS

| 4,645,975 | A |   | 2/1987  | Meitzler et al. |
|-----------|---|---|---------|---------------------------|
| 4,832,427 | A | * | 5/1989  | Nanba et al. ........ 359/15 |
| 4,968,895 | A | * | 11/1990 | Leclercq ........ 307/10.8 |
| 5,543,923 | A | * | 8/1996  | Levers et al. ........ 356/445 |
| 5,756,988 | A | * | 5/1998  | Furuta ........ 250/208.1 |
| 6,201,236 | B1| * | 3/2001  | Juds ........ 250/221 |
| 6,307,198 | B1| * | 10/2001 | Asakura et al. ........ 250/227.25 |
| 7,000,721 | B2| * | 2/2006  | Sugawara et al. ........ 180/169 |
| 2004/0075828 | A1 | * | 4/2004 | Sautter et al. ........ 356/239.8 |

FOREIGN PATENT DOCUMENTS

| DE | 197 01 258 | 7/1997 |
|----|------------|--------|
| DE | 199 33 642 | 3/2001 |
| JP | 03 210433  | 9/1991 |
| WO | 99 47396   | 9/1999 |
| WO | 00 45608   | 8/2000 |

\* cited by examiner

*Primary Examiner*—Stephone B. Allen
*Assistant Examiner*—Don Williams
(74) *Attorney, Agent, or Firm*—Kenyon & Kenyon LLP

(57) ABSTRACT

A sensor device is proposed, particularly for controlling lighting devices of a motor vehicle, having at least one receiver for receiving radiation from at least one receiver region, and a control device which is capable of controlling peripheral devices; a diffractive element, able to be attached to a window and formed preferably as a hologram, is provided which is arranged in the receiver region of the receiver.

9 Claims, 1 Drawing Sheet

SENSOR DEVICE, PARTICULARLY FOR CONTROLLING LIGHTING DEVICES OF A MOTOR VEHICLE

FIELD OF THE INVENTION

The present invention relates to a sensor device, particularly for controlling lighting devices of a motor vehicle.

BACKGROUND INFORMATION

Numerous sensor devices are already known which are used for controlling lighting devices of motor vehicles. Such a sensor device is described, for example, in the German Published Patent Application No. 199 33 642. It has a bulky light-guiding member made of transparent plastic that is secured on the window of a motor vehicle via a coupling medium. This light-guiding member images the radiation of light from various solid-angle regions onto receivers, which, for their part, control the lighting devices via a suitable control device. Since the lighting conditions in the forward direction of the vehicle are particularly relevant for controlling the lighting devices, the light-guiding member must be arranged on the windshield of the motor vehicle, which restricts the visual range of the driver because of the expansion of the sensor device.

SUMMARY OF THE INVENTION

The sensor device of the present invention has the advantage that, due to a diffractive element, which preferably takes the form of a hologram, a very small and compact sensor device is produced which does not restrict the visual range of the driver, and nevertheless, optimally controls the peripheral devices. To that end, the diffractive element is arranged in the receiver region of a receiver, so that the receiver receives radiation from the surroundings, e.g. sunlight or artificial light from specific relevant space areas, and relays to a control device.

If the diffractive element is formed in the receiver region of the receivers in such a way that it images radiation from various spatial reception regions onto a single receiver, then an optimal response of the sensor device results, since reaction is possible in a differentiated fashion to the various lighting conditions in different directions around the motor vehicle.

It is particularly advantageous if a plurality of receptions are provided which detect radiation from various spatial reception regions, and a single diffractive element is provided for all reception regions. The individual brightness signals from the various spatial reception regions are thereby each available individually, making it possible to optimally control the individual lighting devices or other peripheral devices of the motor vehicle. Because a single diffractive element is provided for all reception regions, particularly for a global and directional sensor system, the costs of a sensor device according to the present invention are reduced to a minimum.

In this context, it is particularly advantageous if the receiver has a light-sensitive receiver element and a light guide. The receiver element, which typically has a semiconductor structure, may be arranged outside of the window of the motor vehicle in such a way that only the diffractive element and the light guide, which do not impair the outward visibility from the vehicle, are positioned in the visual range of the driver.

If the diffractive element has a first region which, in the mounted position, images radiation from the forward direction of the motor vehicle onto the receiver, and has a second region which, in the mounted position, images radiation from an angular range, that corresponds approximately to the direction of surface normal of the window, onto the receiver, then, on one hand, it is possible to detect the total brightness in the vicinity of the vehicle, and nevertheless, to react to dark stretches lying in front of the vehicle such as, for example, tunnel or bridge passages.

It is particularly advantageous if the diffractive element is controllable, so that the reception region is adjustable as a function of control signals. In this way, for example, measurements may be carried out in alternation in the forward direction and in the direction of surface normal of the window, and thus information may be obtained from several different reception regions with the aid of a single receiver and a single diffractive element. This yields a more precise control of the peripheral devices, while the costs for the sensor device are only increased a little. In this context, it is particularly advantageous if the diffractive element is controllable periodically.

Furthermore, it must be regarded as advantageous if the diffractive element is formed in one piece with a further diffractive element of a rain sensor. A compact assembly for controlling a windshield wiper device, as well as for controlling lighting devices is thereby made available. Naturally, the aforesaid features may also be transferred correspondingly to a rain sensor device.

DETAILED DESCRIPTION

Figure 1:
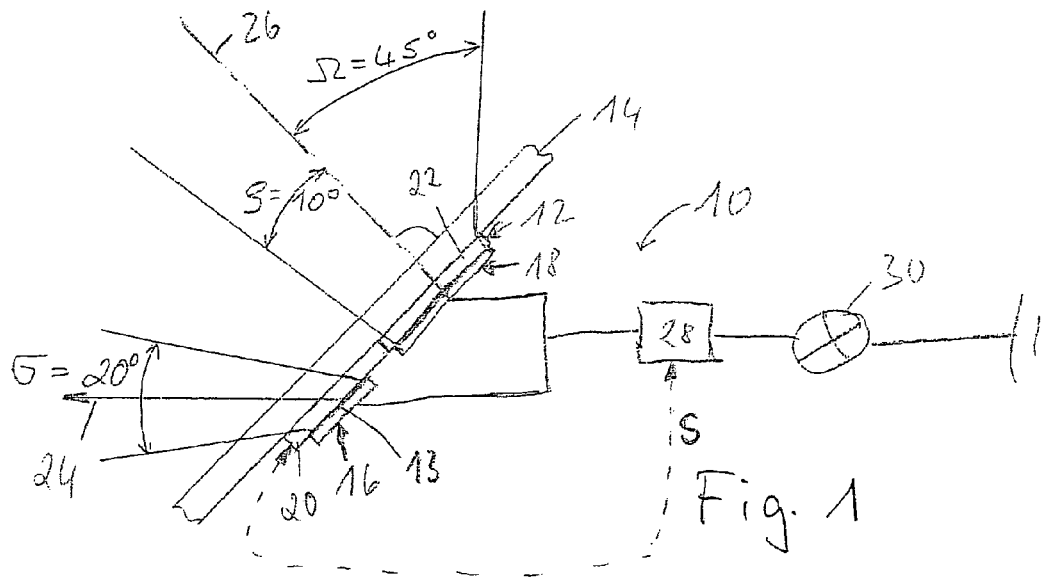
FIG. 1 shows a sensor device according to the present invention in a schematic cross-sectional representation.

FIG. 1 shows a schematic cross-sectional representation of a sensor device according to the present invention. Sensor device 10 is made essentially of a diffractive element 12 formed as a hologram film. This hologram film 12 is pasted or fastened in another manner on a window 14, e.g., the windshield of a motor vehicle; naturally, diffractive element 12 may also be disposed in window 14.

Light-sensitive reception elements 13 are positioned as receivers 16, 18 on the side of diffractive element 12 facing away from window 14. Diffractive element 12 is divided into a first region 20 and a second region 22, and is formed in such a way that receives light from the forward direction of the motor vehicle, indicated by arrow 24, and images on first receiver 16. An acceptance cone a having a width of approximately 20° is thereby formed, which detects radiation from the forward direction. Therefore, here less light radiation is detected in front of a tunnel entrance than on the open road. Second region 22 of diffractive element 12 is formed in such a way that radiation from direction of surface normal 26, which is perpendicular to window 14, is imaged onto the second receiver. In this context, the reception region is selected so that the ambient brightness above the vehicle is detected. To that end, the cone has a dissymmetry, so that radiation from upward, up to $\Omega=45°$ with respect to the direction of surface normal, is detected, and radiation is also detected in the lower direction $\rho=10°$ with respect to the direction of surface normal. Thus, a total acceptance cone $\Omega+\rho$ of approximately 55° results. Both receivers 16, 18 are connected to a control device 28 in which, for example, switching thresholds are stored; when there is a drop below these switching thresholds or they are exceeded, lighting devices 30 are switched on or switched off.

Figure 2:
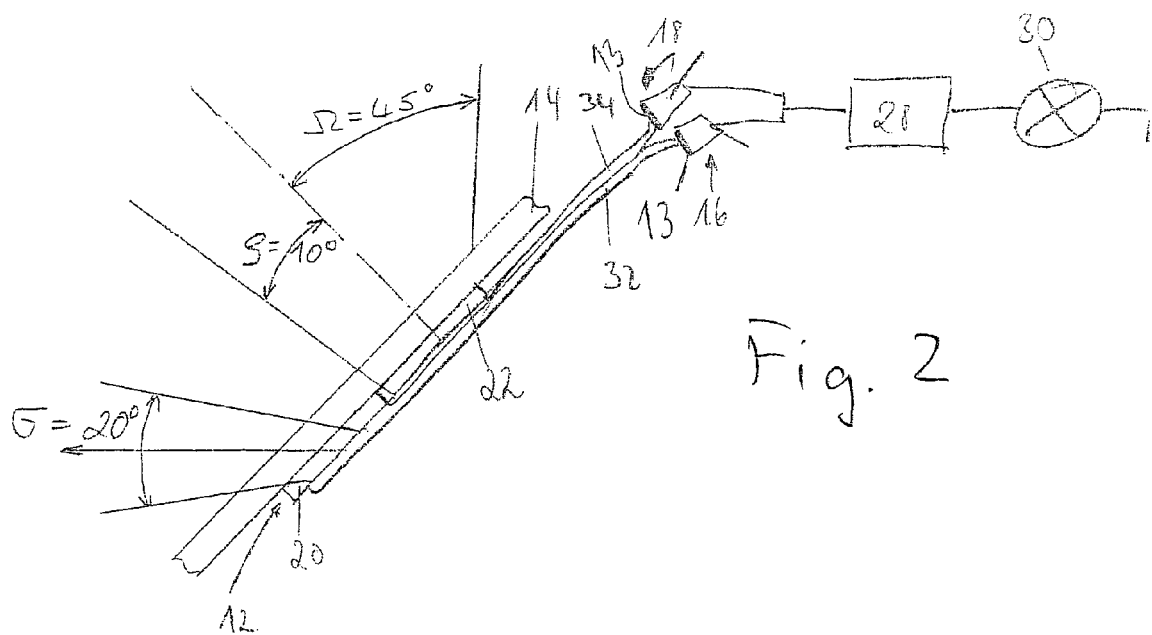
FIG. 2 shows a variation of a sensor device according to the invention from FIG. 1.

FIG. 2 shows a variation of the sensor device according to the present invention from FIG. 1. The hologram film is again pasted as diffractive element 12 on window 14. In front of their light-sensitive receiver elements 13, receivers 16, 18 have first light guides 32 and second light guides 34, connected correspondingly to first region 20 and second region 22, which guide the light to receiver elements 13 that are disposed, for example, in the roof of the motor vehicle, outside of window 14, and therefore are not visible to the driver. These receivers 16, 18 are in turn connected to control device 28 which controls lighting devices 30.

Naturally, any other peripheral devices 30 may be controlled by sensor device 10 according to the present invention. Presenting themselves for this purpose are, for example, sun roofs, sun blinds, convertible tops, heating, ventilation, air conditioner system, recirculation flap and windshield wiper/washer devices, but also door locks, i.e., the central locking system. In addition, it is conceivable to limit the vehicle speed when a tunnel is detected, or when lighting conditions on the whole become poorer. Moreover, sensor device 10 may also be used to program other devices of the motor vehicle. This may be accomplished, for example, by temporarily positioning a selectively controllable light source on the vehicle in the area of sensor device 10, the light source being controlled via specific light signals that correspond to a coding. Sensor device 10 may thereby also be used as an input port for a motor vehicle, which is advantageous especially when the motor vehicle is locked. Thus, it may be useful to have the motor vehicle opened by the central locking system when specific signals are relayed by first receiver 16 and/or second receiver 18.

What is claimed is:

1. A sensor device, comprising:
   at least one receiver for receiving radiation from at least one receiver region and detecting a peripheral brightness of surroundings of a vehicle;
   a control device capable of controlling a lighting device of the vehicle as a function of signals from the receiver; and
   a diffractive element capable of being attached to a window of the vehicle and positioned in the at least one receiver region of the at least one receiver.

2. The sensor device as recited in claim 1, wherein:
   the diffractive element is formed as a hologram.

3. The sensor device as recited in claim 1, wherein:
   the diffractive element is formed in the at least one receiver region in such a way that the diffractive element images radiation from various delimited, spatial reception regions onto a single one of the at least one receiver.

4. The sensor device as recited in claim 1, wherein:
   the at least one receiver includes a plurality of receivers for detecting radiation from various spatial reception regions, and
   the diffractive element is provided for all the various spatial reception regions.

5. The sensor device as recited in claim 1, wherein:
   the at least one receiver includes a light-sensitive receiver element and a light guide.

6. The sensor device as recited in claim 1, wherein:
   the diffractive element includes at least one first region that, in a mounted position, images radiation from a forward direction of a motor vehicle onto the at least one receiver, the diffractive element includes a second region that, in the mounted position, images radiation from an angular range corresponding approximately to a direction of surface normal of the window, onto the at least one receiver.

7. The sensor device as recited in claim 1, wherein:
   the diffractive element is controllable, so that the at least one receiving region is adjustable as a function of a control signal.

8. The sensor device as recited in claim 7, wherein:
   the diffractive element is controllable periodically.

9. The sensor device as recited in claim 1, wherein:
   the diffractive element is formed in one piece with a further diffractive element of a rain sensor.

\* \* \* \* \*